United States Patent
Bi et al.

(10) Patent No.: US 11,305,557 B2
(45) Date of Patent: Apr. 19, 2022

(54) DE-CONTENTED FLUID EJECTION (71) Applicant: Hewlett-Packard Development Company, L.P., Spring, TX (US)

(72) Inventors: Yubai Bi, San Diego, CA (US); Guillermo Martinez Ariza, San Diego, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 318 days.

(21) Appl. No.: 16/332,200

(22) PCT Filed: Oct. 12, 2016

(86) PCT No.: PCT/US2016/056633
§ 371 (c)(1),
(2) Date: Mar. 11, 2019

(87) PCT Pub. No.: WO2018/071016
PCT Pub. Date: Apr. 19, 2018

(65) Prior Publication Data
US 2019/0270302 A1 Sep. 5, 2019

(51) Int. Cl.
B41J 2/01 (2006.01)
B41M 7/00 (2006.01)
(Continued)

(52) U.S. Cl.
CPC ............ B41J 11/002 (2013.01); B41J 2/01 (2013.01); B41J 2/155 (2013.01); B41J 2/21 (2013.01);
(Continued)

(58) Field of Classification Search
None
See application file for complete search history.

(56) References Cited

U.S. PATENT DOCUMENTS 4,165,399 A * 8/1979 Germonprez .......... C09D 11/36
106/31.06
8,133,539 B2 3/2012 Oberski
(Continued)

FOREIGN PATENT DOCUMENTS

CN 1073464 6/1993
CN 1280059 1/2001
(Continued)

OTHER PUBLICATIONS

KBA Introduces VariDry LED-UV Sheetfed Press Drying Technology, May 15, 2014, < http://www.piworld.com/article/kba-introduces-varidry-led-uv-sheetfed-press-drying-technology/ >.
(Continued)

Primary Examiner — Leslie J Evanisko
(74) Attorney, Agent, or Firm — Tong Rea Bentley & Kim LLC (57) ABSTRACT In example implementations, a system is provided. The system includes at least one fluid ejection apparatus, a heater and an energy source. The at least one fluid ejection apparatus dispenses a de-contented fluid onto a substrate during conveyance of the substrate. The heater is arranged after the at least one fluid ejection apparatus along a substrate conveying path. The heater removes a liquid from the de-contented fluid on the substrate such that the particles of the de-contented fluid remain on the substrate. The energy source is arranged after the heater along the substrate conveying path. The energy source applies energy to the substrate during the conveyance of the substrate to heat the substrate to a temperature that is approximately a melting temperature of the substrate to fuse the particles on the substrate to the substrate.

15 Claims, 6 Drawing Sheets (51) Int. Cl.
*B41J 11/00* (2006.01)
*B41M 5/00* (2006.01)
*C09D 11/30* (2014.01)
*B41J 2/155* (2006.01)
*B41J 2/21* (2006.01)

(52) U.S. Cl.
CPC ...... *B41J 11/00216* (2021.01); *B41M 5/0017* (2013.01); *B41M 5/0023* (2013.01); *B41M 7/009* (2013.01); *C09D 11/30* (2013.01); *B41M 5/0064* (2013.01)

(56) References Cited

U.S. PATENT DOCUMENTS

| | | |
|---|---|---|
| 8,567,936 B2 | 10/2013 | Edwards |
| 9,279,058 B2 | 3/2016 | Pervan et al. |
| 9,376,582 B1 * | 6/2016 | Dannhauser ......... B41M 5/0011 |
| 2002/0146265 A1 * | 10/2002 | McCoy ................... B41J 13/12 400/120.01 |
| 2006/0290760 A1 | 12/2006 | German et al. |
| 2008/0171149 A1 | 7/2008 | Hastie |
| 2011/0239882 A1 | 10/2011 | Ishikawa |

FOREIGN PATENT DOCUMENTS

| | | | |
|---|---|---|---|
| CN | 1575978 | 2/2005 | |
| CN | 101830112 | 9/2010 | |
| CN | 101883685 | 11/2010 | |
| CN | 104661825 | 5/2015 | |
| CN | 105026172 | 11/2015 | |
| EP | 1491332 | 12/2004 | |
| EP | 2053104 A1 | 4/2009 | |
| RU | 2258010 | 8/2005 | |
| RU | 2339520 | 11/2008 | |
| RU | 2468923 | 12/2012 | |
| WO | WO-2014087723 A1 * | 6/2014 | .......... B41F 23/0453 |
| WO | WO-2014109703 | 7/2014 | |
| WO | WO-2015016902 A1 * | 2/2015 | ............ B41J 11/002 |

OTHER PUBLICATIONS

Printer Experiences Positive Results Using LED UV on Heidelberg Speedmaster, Dec. 8, 2015, < http://www.piworld.com/article/led-uv-gains-momentum-in-commercial-printing/ >.

* cited by examiner

DE-CONTENTED FLUID EJECTION

BACKGROUND

De-contented ink is not commonly used to print on media such as paper. De-contented ink has desirable properties such as better jettability, longer shelf life, and low volatile organic compound (VOC) emissions.

Other types of media, such as plastics, use inks that contain non-polar, water insoluble and high molecular binders that are jetted together with pigment colorants. These types of inks contain large amount of co-solvent to facilitate the jetting and to swell the plastic substrate. These co-solvents have to be driven away by heating. This is followed by fusing. This process can limit print speeds and create VOC issues.

DETAILED DESCRIPTION

The present disclosure discloses a system and method for printing on plastic substrates. As discussed above, some methods used to print on plastic substrates do not print a durable image. The ink that is applied to the plastic substrate can be easily removed.

Some solutions include using inks that contain non-polar, water insoluble, and high molecular weight latex binders that are jetted together with pigment colorants, as described above to achieve durability. However, these types of inks contain large amounts of co-solvents to facilitate the jetting and to swell the plastic substrate. These co-solvents have to be driven away, then the ink film is fused at high temperatures. However, this process can limit print speeds and create VOC issues.

In addition, the non-polar, water insoluble, high molecular weight latex binder can create an insoluble crust on the printing nozzle surface. The insoluble crust can gradually block the jetting nozzle. As a result, jetting may not be sustained and reliable jetting may not be achieved.

It would be preferable to use de-contented ink to print on plastic substrates. De-contented inks are inks that do not include any binder or solvents. A de-contented inks has desirable properties such as a longer shelf life, better jettability, and low VOC emissions. However, de-contented ink does not generate durable images on plastic substrates because there is no binder to bind the pigments on the plastic substrates.

The present disclosure provides a system that can produce a durable image on a substrate (e.g., plastic-based substrates) using de-contented ink. A durable image may be defined as an image that can withstand an eraser rub, wiping with a liquid such as 70% isopropylalcohol (IPA) or Windex®, tape adhesion, and the like.

In one implementation, energizing the de-contented ink film, e.g., heating the particles of de-contented ink to a temperature that is close to, or just below, a melting temperature of the plastic substrate, produces a durable image. Heating the particles of de-contented ink allows the particles to diffuse or melt into the surfaces of the plastic substrate. In other words, the particles can be imbibed by the plastic substrate. Said another way, some hydrophobic binder may migrate into the condensed pigment matrices, thereby, generating a durable image.

Figure 1:
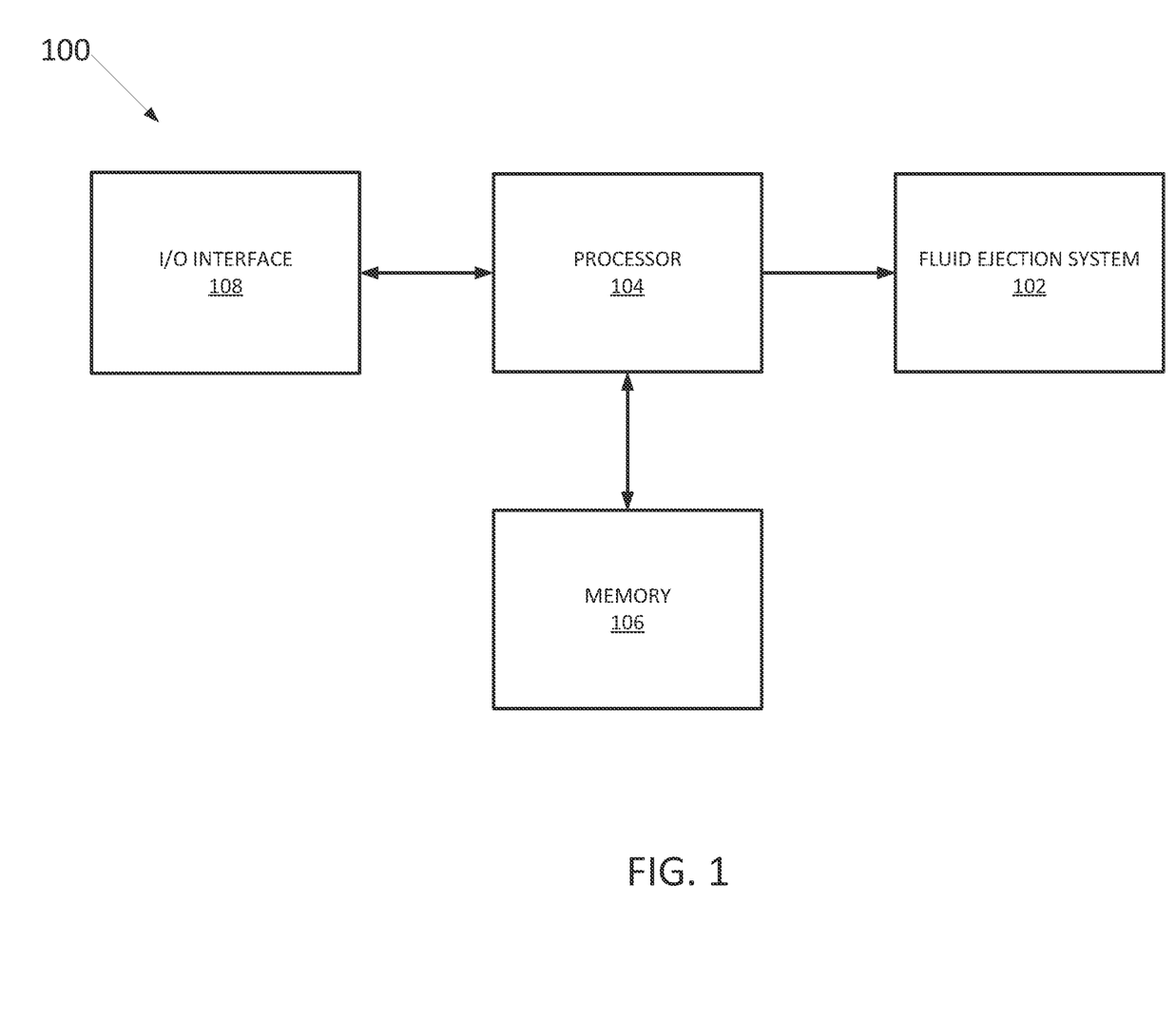
FIG. 1 is a block diagram of an example system of the present disclosure.

FIG. 1 illustrates a block diagram of an example system 100 of the present disclosure. The system 100 includes a fluid ejection system 102, a processor 104, a memory 106 and an input/output (I/O) interface 108. In one example, the fluid ejection system 102 may be used to print on substrates. For example, the fluid ejection system 102 may be a printer, a multi-function device, a distributed printing system, and the like.

In one implementation, the fluid ejection system 102 may include a fluid ejection apparatus 110, a heater 112, and an energy source 114. Examples and additional details of the fluid ejection apparatus 110, the heater 112 and the energy source 114 are described below.

As will be appreciated, the fluid ejection system 102, as described herein, may selectively eject droplets of fluid such that the droplets of fluid may be deposited on a substrate. The patterning of such deposited droplets of fluid on the substrate may cause an image to be formed on the substrate. Such formation of an image may be referred to as printing.

In one example, the processor 104 may control operation of the fluid ejection system 102 and the various components within the fluid ejection system 102. In one example, the memory 106 may be a non-transitory computer readable medium that stores instructions that are executed by the processor. In one example, the I/O interface 108 may include a display, a keyboard, an input device (e.g., a mouse or a touchpad), and the like. The I/O interface 108 may allow a user to enter a print job that is executed by the fluid ejection system 102 under control of the processor 104.

It should be noted that the system 100 may include additional components not shown. For example, the system 100 may also include a feedback loop, communication modules, and the like.

Figure 2:
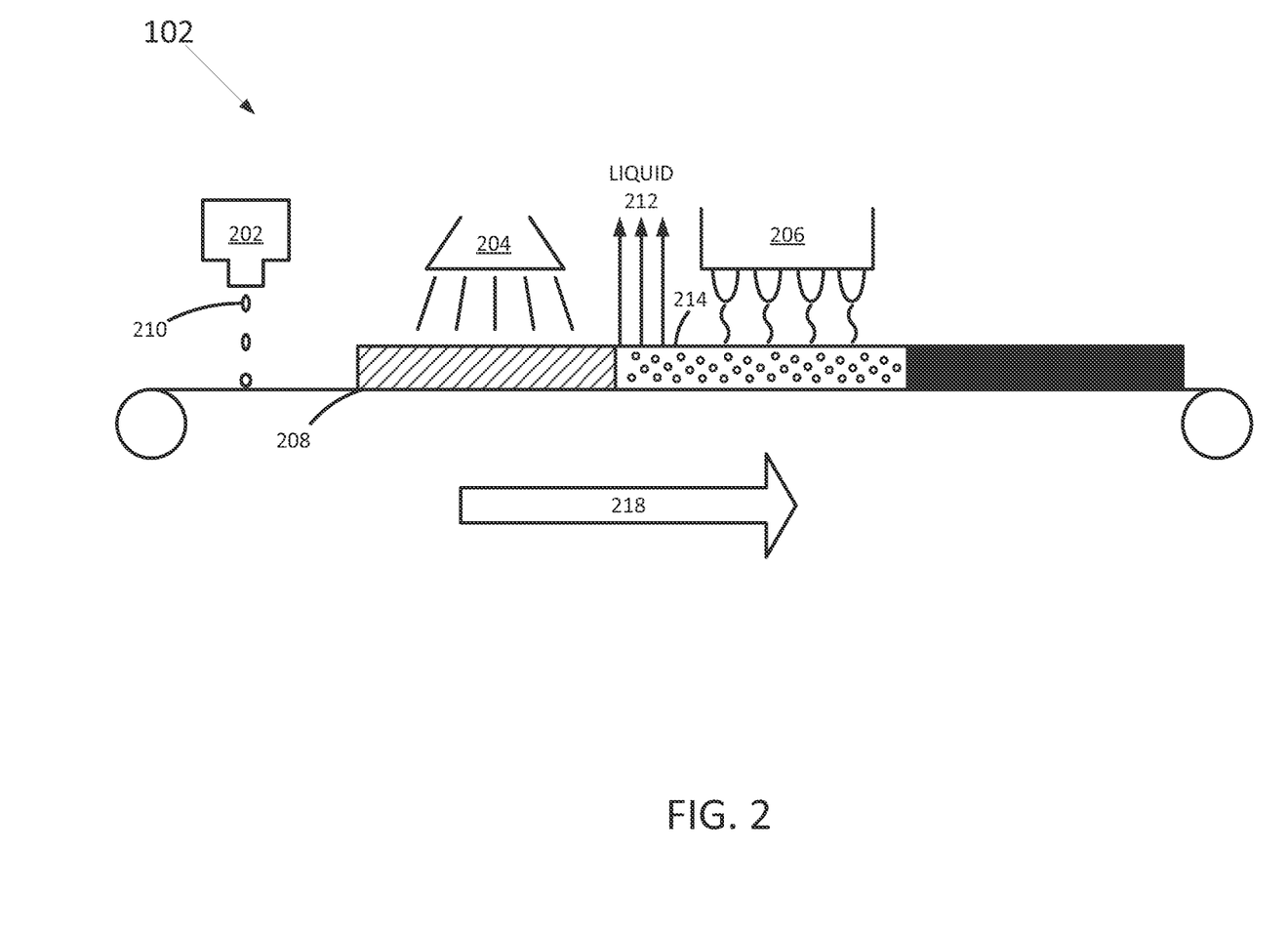
FIG. 2 is a more detailed block diagram of the example system of the present disclosure.

FIG. 2 illustrates a block diagram of an example fluid ejection system 102. In one implementation, the fluid ejection system 102 may include at least one fluid ejection apparatus 202, a heater 204 and an energy source 206. In one example, the energy source 206 may be a light emitting diode (LED) based energy source that includes one LED or a plurality of LEDs. The heater 204 may be arranged along a substrate conveying path 218 after the fluid ejection apparatus 202. The energy source 206 may be arranged along the substrate conveying path 218 after the heater 204.

In one example, a substrate 208 may be moved along the substrate conveying path 218 below the fluid ejection apparatus 202, the heater 204 and the energy source 206. In one example, the substrate 208 may be a plastic. For example, the plastic may be a poly vinyl chloride (PVC), polycarbonate, or any other plastic.

In another example, the fluid ejection apparatus 202, the heater 204 and the energy source 206 may be moved over the substrate 208 (e.g., via a movable carriage). It should be noted that although the substrate conveying path 218 is illustrated as moving from left to right in FIG. 2 that the substrate conveying path 218 may also move from right to left if the order of the fluid ejection apparatus 202, the heater 204 and the energy source 206 are rearranged.

In one example, the fluid ejection apparatus 202 may eject, or dispense, a de-contented fluid 210 onto the substrate 208. The de-contented fluid 210 may be an ink that does not contain any binders, such as polyurethane, grafted polyurethane (PUG), latexes or small amounts of solvent. In one example, the de-contented fluid 210 may be a water based ink that is easily jettable and has low VOC emissions.

Although a single fluid ejection apparatus 202 is illustrated in FIG. 2, it should be noted that the fluid ejection system 102 may include a plurality of fluid ejection apparatuses 202. For example, the fluid ejection system 102 may be a distributed print system that uses a plurality of fluid ejection apparatuses 202 to print across a width of the substrate 208. In other words, the number of the plurality of fluid ejection apparatuses 202 may correspond to a width of the substrate 208.

In one example, the single fluid ejection apparatus 202 may dispense a plurality of different colored de-contented fluids 210. In another example, a plurality of fluid ejection apparatuses 202 may each dispense a different colored de-contented fluid 210 or each dispense a plurality of different colored de-contented fluids 210.

In one example, the heater 204 may remove liquid 212 from the de-contented fluid 210 that is applied to the substrate 208. As a result, particles 214 of the de-contented fluid 210 may remain on the substrate 208 after the de-contented fluid 210 is dried. In one example, the liquid 212 that is removed may be water.

As the substrate 208 moves along the substrate conveying path 218, the particles 214 that remain on the substrate 208 may pass below the energy source 206. The energy source 206 may emit energy that is absorbed by the particles 214. The particles 214 may be heated to a temperature that is just below a melting temperature of the substrate 208.

Using an LED based energy source 206 may provide many advantages over other heating methods. In one example, the LED based energy source 206 may be instantly turned on and off to precisely control the amount of energy that is applied, and thereby, the temperature of the particles 214 when the LED based energy source 206 is activated. In contrast, other heating methods such as thermal fusion or infrared heating can continue to heat the atmosphere around the particles 214 even when the energy source is turned off.

In addition, the LED based energy source 206 may be more selective. The LED based energy source 206 may be directed towards specific areas of the substrate 208. In other words, the LED based energy source 206 may provide a more targeted heating.

Figure 5:
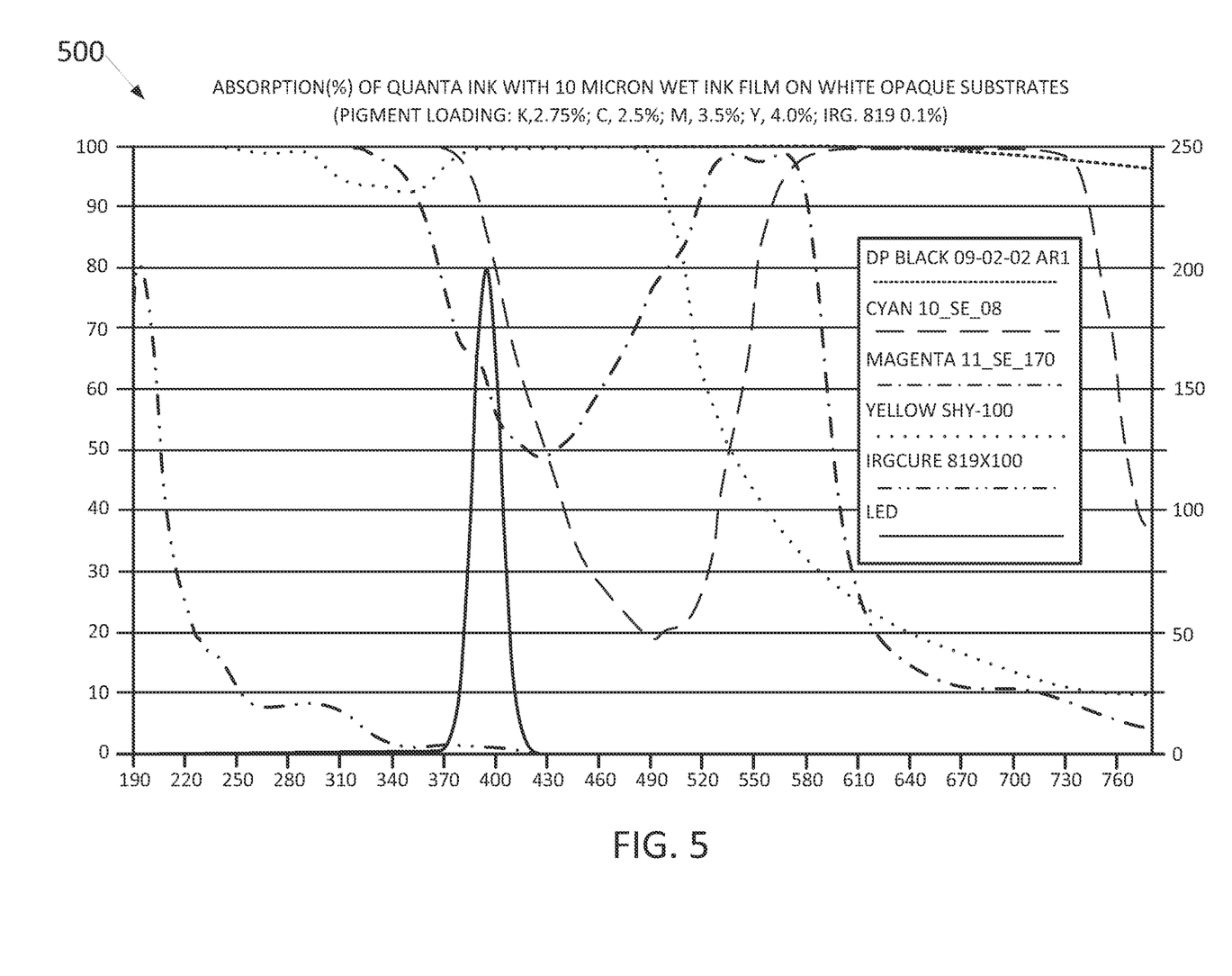
FIG. 5 is an example chart of absorption percentages at different wavelengths for different colors.

Moreover, different LEDs of the LED based energy source 206 may apply energy to different specific colors. For example, fluid ejection system 102 may be a cyan, magenta, yellow, key (or black) (CYMK) color printer. Each color (e.g., cyan, magenta, yellow and black) may absorb different wavelengths of light to be energized, or heated. FIG. 5 illustrates an example chart 500 that illustrates the absorption percentages at different wavelengths for different colors.

The chart 500 illustrates a wavelength of an example LED. The wavelength emitted by the example LED in the chart 500 may be absorbed at high percentages by the yellow and black colors of the example ink. A second LED may be used to emit wavelengths around 520 nanometers (nm) to 580 nm to heat the cyan and magenta colors.

As a result, the LED based energy source 206 may have a plurality of different LED lights that each emit a different wavelength of energy. In other words, each one of the plurality of different LED lights may be a different color that emits a different wavelength of light onto the particles 214. Depending on the colors of the particles 214 on the substrate 208, different LED lights of the LED based energy source 206 may be selectively turned on and off.

The particles 214 may be dried in one cycle under the LED based energy source 206. In another example, the particles 214 may be dried via multiple cycles under the LED based energy source 206. For example, each cycle may melt different colored particles 214 using different LED energy wavelengths of the LED based energy source 206.

In one example, the particles 214 may be heated quickly by the LED based energy source 206. For example, the particles 214 may be exposed to the LED based energy source 206 for only a few seconds. For example, the substrate conveying path 218 may be moved at a rate of approximately seven feet per minute.

Referring back to FIG. 2, after the particles 214 are melted, the particles 214 may be infused into, or imbibed by, the substrate 208. As noted above, the particles 214 may be heated to a temperature that is approximately a melting temperature of the substrate 208. In one example, the temperature may be just below the melting temperature of the substrate 208. In one example, the melting temperature of the substrate 208 may be approximately 150 degrees Celsius (° C.). In another example, where the substrate 208 is polypropylene or polyethylene, the melting temperature may be lower than 150° C.

Figure 4:
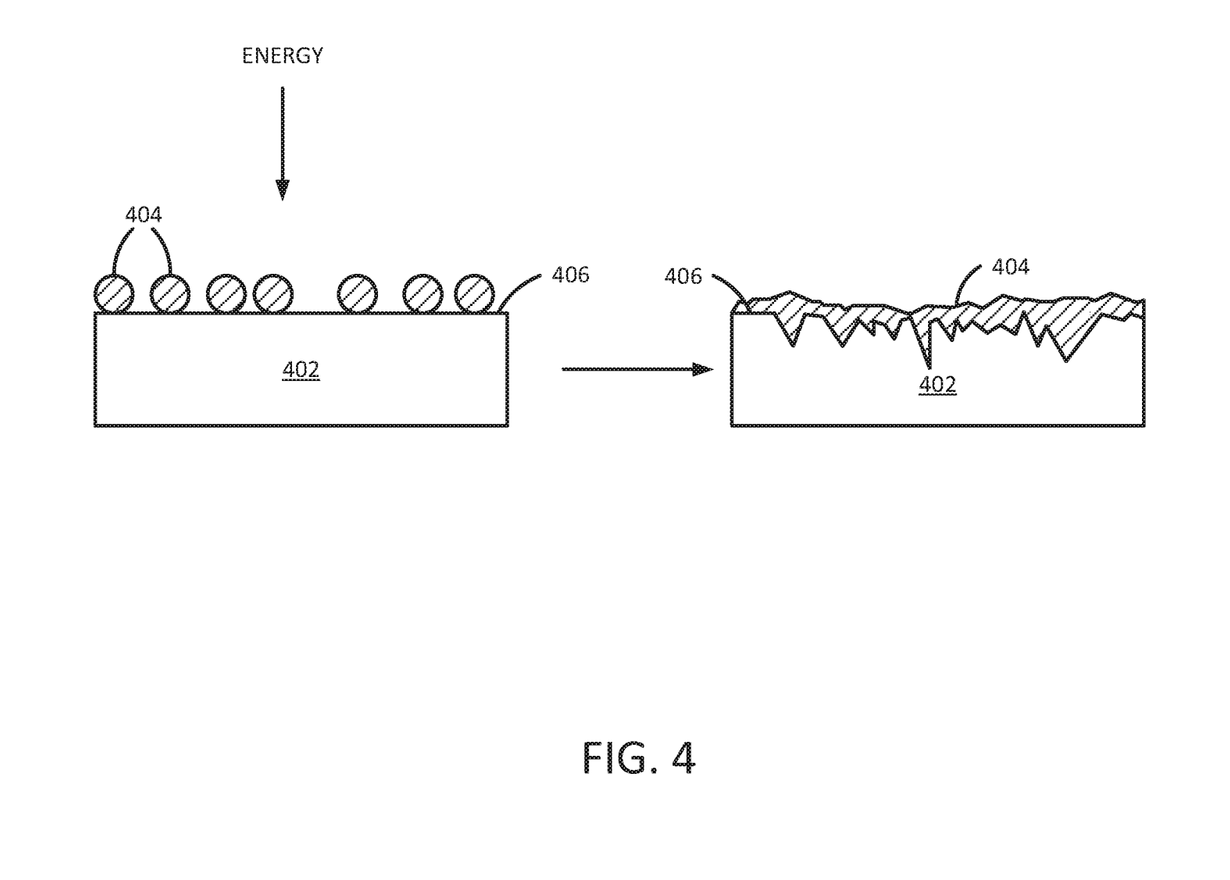
FIG. 4 is an example close up diagram of the particles being imbibed by a substrate.

FIG. 4 illustrates an example close up diagram of the particles 404 being imbibed by a plastic substrate 402. As noted above, previous attempts to print on plastic substrates using de-contented ink were not very successful. For example, the de-contented ink could be removed easily.

However, by heating the particles 404 up to a temperature that is just below the melting temperature of the plastic substrate 402, the particles 404 may be melted. As the substrate 402 reaches near a melting temperature, imperfections may be created in a top surface 406 of the plastic substrate 402. The melted particles 404 may be diffused into, or imbibed by, the imperfections of the top surface 406 of the plastic substrate 402. As a result, the printed image may have better adhesion to the plastic substrate 402 than in previous methods, thereby, creating a more durable printed image.

However, if the substrate 208 has a melting temperature that is greater than 150° C., then heating the particles 214 to a temperature that is just below the melting temperature may negatively affect the particles 214. As a result, a primer may be applied to the substrate 208 as illustrated in FIG. 3 for substrates 208 that have a melting temperature that is greater than a temperature at which the particles 214 may begin to decompose (e.g., greater than 200° C.).

Figure 3:
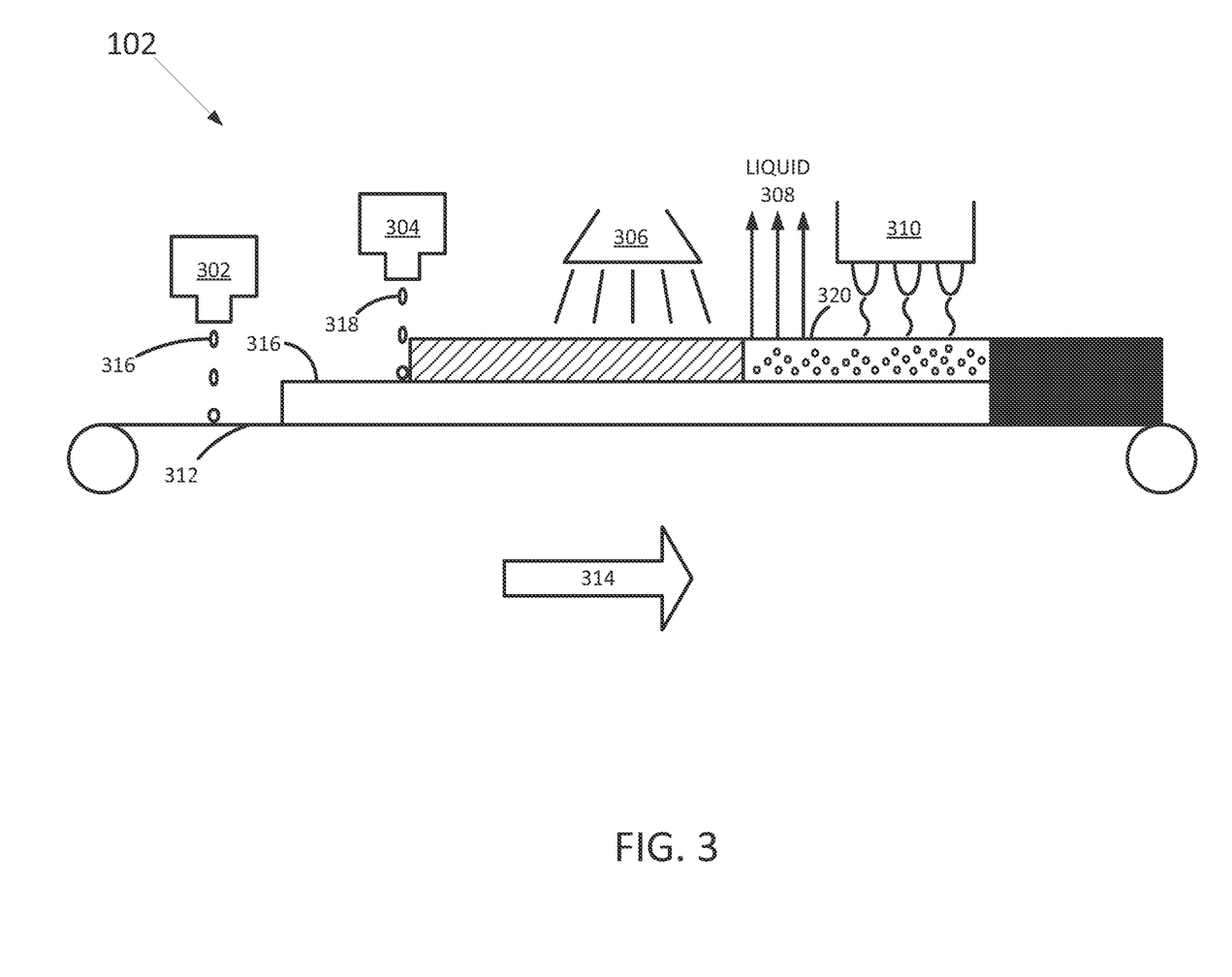
FIG. 3 is another more detailed block diagram of the example system of the present disclosure.

The example fluid ejection system 102 in FIG. 3 may include a primer applying device 302, at least one fluid ejection apparatus 304, a heater 306 and an LED energy source 310. The at least one fluid ejection apparatus 304 may be arranged along a substrate conveying path 314 after the primer applying device 302. The heater 306 may be arranged along the substrate conveying path 314 after the fluid ejection apparatus 304. The LED energy source 310 may be arranged along the substrate conveying path 314 after the heater 306.

In one example, a substrate 312 may be moved along the substrate conveying path 314 below the primer applying device 302, the fluid ejection apparatus 304, the heater 306 and the LED energy source 310.

In another example, the primer applying device 302, the fluid ejection apparatus 304, the heater 306 and the LED energy source 310 may be moved over the substrate 312

(e.g., via a movable carriage). It should be noted that although the substrate conveying path 314 is illustrated as moving from left to right in FIG. 3, the substrate conveying path 314 may also move from left to right if the order of the primer applying device 302, the fluid ejection apparatus 304, the heater 306 and the LED energy source 310 are rearranged.

In one example, the substrate 312 may be a plastic substrate that has a melting temperature that is higher than 150° C. As a result, heating the particles 320 that are left by de-contented fluid 318 that is dispensed by the fluid ejection apparatus 304 to temperatures higher than 150° C. may damage the particles 320. For example, the particles may become decomposed at temperatures around 200° C. and higher.

As a result, a primer 316 may be dispensed, or applied, onto the substrate 312 before the de-contented fluid 318 is dispensed. The primer 316 may be a thermally fusible primer. The thermally fusible primer may be a latex or a wax.

In another implementation, the primer layer may be coated with a different coating method. For example, the coating method may include Gravure coating, reverse roll coating, knife-over-roll coating, metering rod coating, slot die coating, curtain coating, air knife coating, and the like. The coating may be dried before reaching the fluid ejection apparatus 304.

The fluid ejection apparatus 304 may then dispense the de-contented fluid 318 onto the primer 316 to print an image. Although a single fluid ejection apparatus 304 is illustrated in FIG. 3, it should be noted that the fluid ejection system 102 may include a plurality of fluid ejection apparatuses 304. For example, the fluid ejection system 102 may be a distributed print system that uses a plurality of fluid ejection apparatuses 304 to print across a width of the substrate 312. In other words, the number of the plurality of fluid ejection apparatuses 304 may correspond to a width of the substrate 312.

In one example, the single fluid ejection apparatus 304 may dispense a plurality of different colored de-contented fluids 318. In another example, a plurality of fluid ejection apparatuses 304 may each dispense a different colored de-contented fluid 318 or each dispense a plurality of different colored de-contented fluids 318.

In one example, the heater 306 may remove liquid 308 from the de-contented fluid 318 that is applied to the substrate 312. As a result, the particles 320 of the de-contented fluid 318 may remain on the substrate 312 after the de-contented fluid 318 is dried. In one example, the liquid 308 that is removed may be water.

As the substrate 312 moves along the substrate conveying path 314, the particles 320 that remain on the substrate 312 may pass below the LED energy source 310. The LED energy source 310 may emit energy that is absorbed by the particles 320. The particles 320 may be heated to a temperature that is just below a melting temperature of the primer 316. In one example, the temperature may be a temperature just below the melting temperature of the primer 316 (e.g., just below 150° C.).

After the particles are melted, the particles 214 may be infused into the primer 316. The primer 316 may be adhered to the substrate 312. The use of the primer 316 allows the substrate 312 to be a variety of different materials. For example, in addition to plastics that have a melting temperature below 150° C., the substrate 312 may also be plastics that have a melting temperature above 150° C., metals, and the like.

Figure 6:
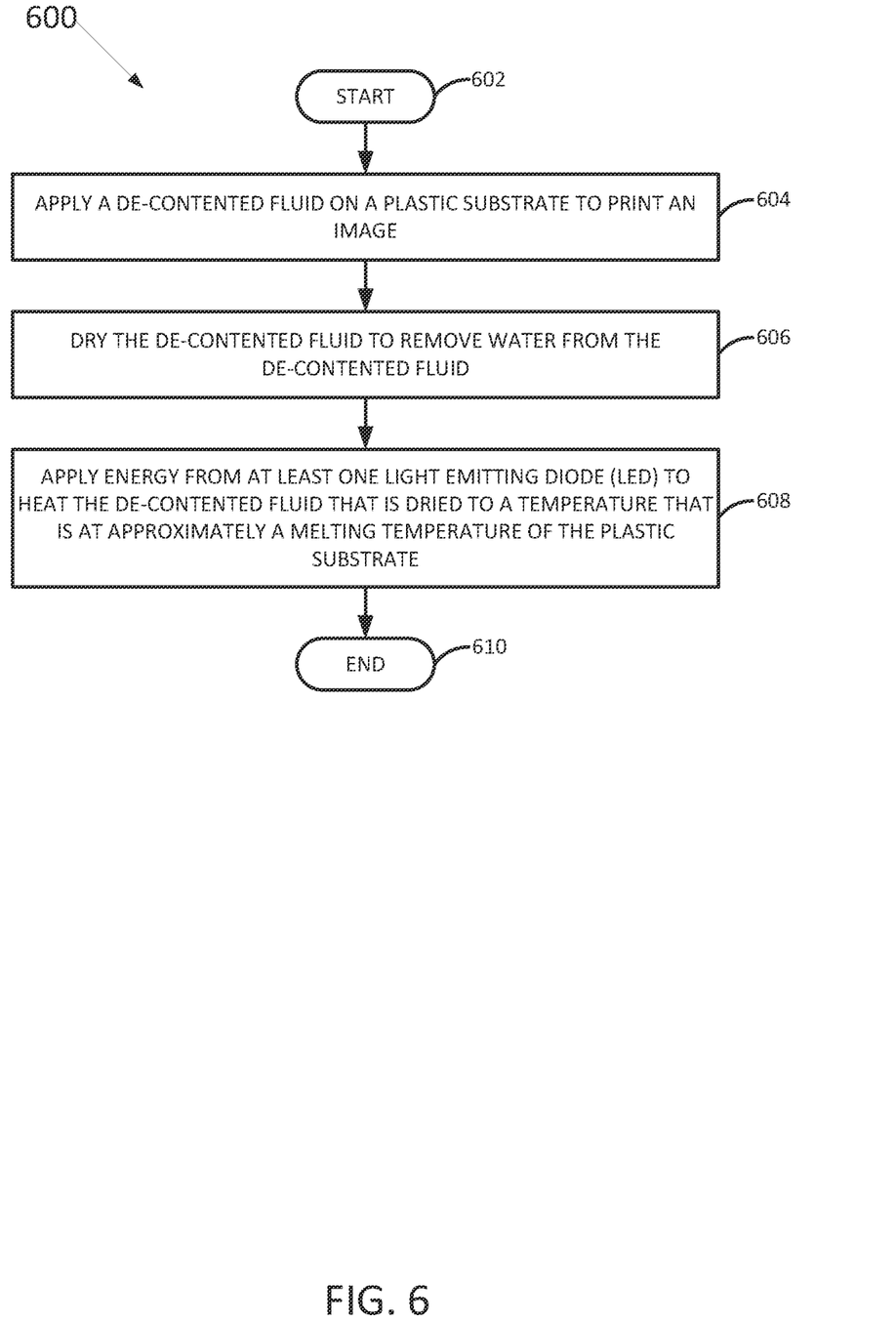
FIG. 6 is a flow diagram of an example method for printing de-contented ink on a plastic substrate.

FIG. 6 illustrates a flow diagram of an example method 600 for printing de-contented ink on a plastic substrate. In one example, the blocks of the method 600 may be performed by the system 100 or the fluid ejection system 102.

At block 602, the method 600 begins. At block 604, the method 600 applies a de-contented fluid on a plastic substrate to print an image. For example, the de-contented fluid may be an ink having one or more different colors that are applied by a fluid ejection apparatus to print the image on the plastic substrate.

In some implementations, a primer may be applied to the plastic substrate before the de-contented fluid is dispensed onto the plastic substrate. The primer may be a thermally fusible primer.

At block 606, the method 600 dries the de-contented fluid to remove water from the de-contented fluid. In one example, a heater may apply heat to the de-contented fluid to remove liquid (e.g., water) from the de-contented fluid.

At block 608, the method 600 applies energy from at least one LED to heat the de-contented fluid that is dried to a temperature that is at approximately a melting temperature of the plastic substrate. In one implementation, the LED may be part of an LED energy source. The LED energy source may have a plurality of different LEDs to emit energy at different wavelengths. The different wavelengths may be selectively absorbed by different colors of particles that remain on the plastic substrate after the liquid is removed from the de-contented fluid.

The energy emitted by the LED may be absorbed by the particles to heat the particles and melt the particles. In one example, the melting temperature of the plastic substrate may be approximately 150° C. and the particles may be heated to a temperature that is just below the melting temperature, or just below 150° C. At block 610, the method 600 ends.

It will be appreciated that variants of the above-disclosed and other features and functions, or alternatives thereof, may be combined into many other different systems or applications. Furthermore, the term "approximately" when used with regard to a value may correspond to a range of ±10%. Various presently unforeseen or unanticipated alternatives, modifications, variations, or improvements therein may be subsequently made by those skilled in the art which are also intended to be encompassed by the following claims.

The invention claimed is:
1. A system, comprising:
    at least one fluid ejection apparatus to dispense a de-contented fluid onto a plastic substrate during conveyance of the substrate;
    a heater arranged after the at least one fluid ejection apparatus along a substrate conveying path, the heater to remove a liquid from the de-contented fluid on the plastic substrate such that particles of the de-contented fluid remain on the plastic substrate;
    an energy source arranged after the heater along the substrate conveying path, the energy source to apply energy to the plastic substrate during the conveyance of the plastic substrate; and
    a processor to control the at least one fluid ejection apparatus to dispense the de-contented fluid, to control the heater to heat the de-contented fluid to remove the liquid from the de-contented fluid, and to control the energy source to heat the plastic substrate to a temperature that is approximately a melting temperature of the plastic substrate to create imperfections near a top surface of the plastic substrate and allow particles that are melted to be imbibed by the imperfections to fuse the particles on the plastic substrate to the plastic substrate.

2. The system of claim 1, wherein the at least one fluid ejection apparatus comprises a plurality of fluid ejection apparatuses.

3. The system of claim 2, wherein the plurality of fluid ejection apparatuses corresponds to a width of the plastic substrate.

4. The system of claim 2, wherein each one of the plurality of fluid ejection apparatuses dispenses a different colored de-contented fluid.

5. The system of claim 1, wherein the energy source comprises a plurality of light emitting diodes (LEDs), wherein the plurality of LEDs emits energy at different wavelengths in accordance with an absorption percentage of a respective color of the de-contented fluid on the plastic substrate.

6. The system of claim 1, wherein the melting temperature of the plastic substrate is below 150 degrees Celsius.

7. A system, comprising:
a primer applying apparatus to apply a primer onto a plastic substrate moving along a substrate conveying path;
at least one fluid ejection apparatus to dispense a de-contented fluid onto the plastic substrate moving along the substrate conveying path;
a heater arranged after the at least one fluid ejection apparatus along the substrate conveying path, the heater to remove a liquid from the de-contented fluid on the plastic substrate such that particles of the de-contented fluid remain on the plastic substrate;
an energy source arranged after the heater along the substrate conveying path, the energy source to apply energy to the plastic substrate during conveyance of the plastic substrate; and
a processor to control the primer applying apparatus to apply the primer onto the plastic substrate, to control the at least one fluid ejection apparatus to dispense the de-contented fluid, to control the heater to heat the de-contented fluid to remove the liquid from the de-contented fluid, and to control the energy source to heat the plastic substrate to a temperature that is approximately a melting temperature of the plastic substrate to create imperfections near a top surface of the plastic substrate and allow particles that are melted to be imbibed by the imperfections to fuse the particles on the plastic substrate to the plastic substrate.

8. The system of claim 7, wherein the melting temperature of the plastic substrate is greater than 150 degrees Celsius.

9. The system of claim 8, wherein the primer comprises a thermally fusible primer, wherein the melting temperature of the primer is less than 150 degrees Celsius.

10. The system of claim 7, wherein the at least one fluid ejection apparatus comprises a plurality of fluid ejection apparatuses.

11. The system of claim 10, wherein each one of the plurality of fluid ejection apparatuses dispenses a different colored de-contented fluid.

12. The system of claim 7, wherein the energy source comprises a plurality of light emitting diodes (LEDs), wherein the plurality of LEDs emits energy at different wavelengths in accordance with an absorption percentage of a respective color of the de-contented fluid on the plastic substrate.

13. A method, comprising:
controlling, via a processor, at least one fluid ejection apparatus to dispense a de-contented fluid on a plastic substrate during conveyance of the plastic substrate to print an image;
controlling, via the processor, a heater arranged after the at least one fluid ejection apparatus along a substrate conveying path to heat the de-contented fluid to remove water from the de-contented fluid such that particles of the de-contented fluid remain on the plastic substrate; and
controlling, via the processor, an energy source arranged after the heater along the substrate conveying path to apply energy from at least one light emitting diode (LED) to the plastic substrate during the conveyance of the plastic substrate to heat the plastic substrate to a temperature that is at approximately a melting temperature of the plastic substrate to create imperfections near a top surface of the plastic substrate and allow particles that are melted to be imbibed by the imperfections to fuse the particles on the plastic substrate to the plastic substrate.

14. The method of claim 13, wherein the applying comprises applying different wavelengths of energy from a plurality of LEDs of the at least one light LED such that each LED emits one of the different wavelengths of energy based on an absorption percentage of a color of a plurality of different colors of the de-contented fluid on the plastic substrate.

15. The method of claim 13, wherein the melting temperature is approximately 150 degrees Celsius and the temperature is less than 150 degrees Celsius.

* * * * *